United States Patent [19]

Watts et al.

[11] Patent Number: 4,582,669

[45] Date of Patent: Apr. 15, 1986

[54] XENON SUPPRESSION IN A NUCLEAR FUELED ELECTRIC POWER GENERATION SYSTEM

[75] Inventors: Mark G. Watts, Linavady, Northern Ireland; Robert F. Barry, Monroeville, Pa.

[73] Assignee: Westinghouse Electric Corp., Pittsburgh, Pa.

[21] Appl. No.: 338,458

[22] Filed: Jan. 8, 1982

[51] Int. Cl.$^4$ ............................................... G21C 7/00
[52] U.S. Cl. ............................... 376/218; 376/217; 376/241; 364/527
[58] Field of Search ............... 376/215, 216, 217, 218, 376/241, 242; 364/527

[56] References Cited

U.S. PATENT DOCUMENTS

| | | |
|---|---|---|
| 3,932,885 | 1/1976 | Czefniejewski ..................... 376/217 |
| 4,057,463 | 11/1977 | Morita ................................. 376/218 |
| 4,057,466 | 11/1977 | Thompson et al. ............. 376/241 X |
| 4,222,822 | 9/1980 | Mueller et al. ..................... 376/217 |
| 4,299,657 | 11/1981 | Abenhaim et al. ............. 376/328 X |

FOREIGN PATENT DOCUMENTS

| | | | |
|---|---|---|---|
| 2513823 | 9/1976 | Fed. Rep. of Germany ...... 376/237 |
| 3120314 | 2/1982 | Fed. Rep. of Germany ...... 376/241 |
| 0039094 | 3/1977 | Japan .................................. 376/217 |
| 0054891 | 5/1977 | Japan .................................. 376/217 |
| 0022991 | 3/1978 | Japan .................................. 376/218 |
| 0023892 | 2/1979 | Japan .................................. 376/217 |
| 0039795 | 3/1979 | Japan .................................. 376/241 |
| 0163497 | 4/1981 | Japan .................................. 376/217 |

OTHER PUBLICATIONS

*Nuclear Reactor Engineering*, Glasstone et al., 1967, pp. 261–269.
"Introduction to Nuc. Engr.", Lamarsh (1977), Addison—Wesley, pp. 284–290.

*Primary Examiner*—Deborah L. Kyle
*Assistant Examiner*—Dan Wasil
*Attorney, Agent, or Firm*—Daniel C. Abeles

[57] ABSTRACT

The fissile inventory required in operating a negative power coefficient nuclear reactor in an electric power generating system is reduced by cycling the load imposed on the system when 100% power can no longer be maintained at equilibrium due to xenon poisoning in order to induce an oscillation in the xenon concentration which is in antiphase wtih the power requirements so that 100% power can be maintained at least during part of the day. The load can be progressively reduced by a preset amount each night or a xenon suppression controller which forecasts the xenon reactivity at the time selected for a return to full power as a function reactor history, current reactor flux and an arbitrary load schedule can be used to determine the maximum reduced power level that will permit operation at full power at the selected time.

32 Claims, 17 Drawing Figures

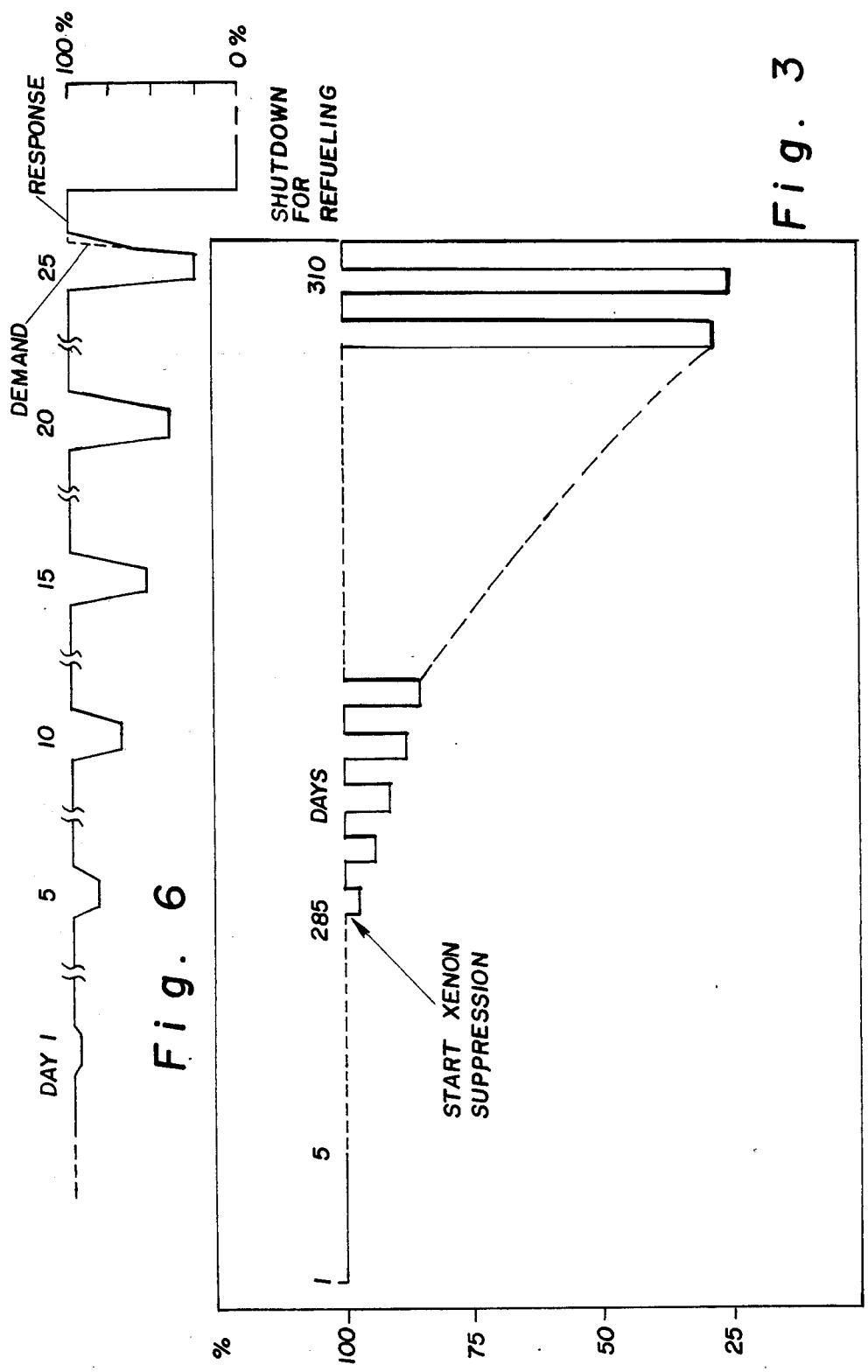

ASSUMPTIONS: 1000 MW$_e$ REACTOR
1100 MWD/MTU
LOAD 28 TONNES OF FUEL EACH CYCLE
(1/3 OF CORE)

XENON SUPPRESSION IN A NUCLEAR FUELED ELECTRIC POWER GENERATION SYSTEM

BACKGROUND OF THE INVENTION

1. Field of the Invention

This invention relates to a method and apparatus for operating the nuclear reactor in an electric power generation system when 100% power can no longer be maintained at equilibrium. Specifically, it is directed to suppression of reactor xenon poisoning near the end of the fuel cycle by cycling of the load imposed on the reactor in such a manner that 100% power can be maintained at least during part of the day.

2. Description of the Prior Art

In the very early days of the nuclear power industry it was envisioned that fuel costs would be so low as to be an almost insignicant part of the cost of generating electricity. With the recent sharp increases in the cost of uranium together with the steady rise in enrichment price this is no longer the case. We have now reached the stage where the cost of the fuel can contribute up to 30% of the cost of producing electricity. Under these conditions every effort must be made to reduce fuel costs.

The cost of fuel can be broken down into three components: (1) fabrication price, (2) ore price, and (3) cost of enrichment services. The fabrication price has steadily declined over a number of years under the influence of competitive pressure. There is little likelihood of further substantial reductions. On the other hand, both the ore price and the enrichment price continue to increase and the only prospects for savings are to reduce the quantities of ore and enrichment which must be used. Reducing ore and/or enrichment necessarily reduces the initial fissile inventory of the core and hence the initial reactivity. Hence these savings can only be effected if a compensating reactivity gain can be found.

It is well known that xenon formed during the operation of a nuclear reactor adversely affects reactor reactivity. Xenon 135 is an isotope with a very, very high cross section for thermal neutron absorption; it is mainly formed by decay of Iodine 135 which is itself formed directly by fission. Xenon 135 will itself decay to a non-absorbing daughter unless a neutron is absorbed within a few hours. None of the stable or long-life members of this chain have any significant commercial value, and Xenon 135 is simply a reactivity burden for a fixed-fuel thermal reactor such as a pressurized water reactor (PWR).

The burden imposed on a nuclear reactor by xenon poisoning is very great. If the effects of xenon poisoning could be fully suppressed, a typical fuel cycle would run three months longer for the same fuel enrichment; or the same fuel cycle length could be attained with the enrichment reduced by 0.4%. In the latter case, a saving of over $5.5 million a year could be realized for a typical PWR. The reality of the situation is, however, that under present practice, sufficient excess reactivity must be provided to compensate for equilibrium xenon poisoning in order to maintain a reactor at full power over the entire length of the fuel cycle. In a PWR this excess reactivity amounts to about 3% in addition to that required to compensate for burnup effects. Further, if the reactor power is reduced, the xenon poisoning will initially increase over a period of about six hours before starting to decay. This xenon transient is generally regarded as an operating constraint as it limits the ability of the plant to return to full power. However, we have found that, by careful planning, it can be turned to advantage and used to offset some of the equilibrium xenon poisoning.

In the typical electric power generation system, the load carried by the system can vary considerably over a 24-hour period. To accommodate these variations, some of the generators are run continuously at full power; others are throttled to accommodate the variations in load; and still others may be started up and placed on line only to handle peak loads. The first group of generators are said to be base loaded. Because of the relatively cheap fuel costs compared to fossil fuels, and the high capital investment, nuclear power plants are usually base loaded. The base loaded nuclear plants are run until full power can no longer be maintained. They are then shut down for refueling or, in some instances, the running period is extended by a coast-down mode of operation in which the maximum power output is slowly reduced until a desired burnup limit is reached. In systems where nuclear plants supply more power than needed for base load, some nuclear plants in the system are used in load sharing and frequency participation; however, in such situations, load is varied to meet system requirements and xenon poisoning is still a constraint near the end of the fuel cycle.

It is a primary object of the present invention to reduce the cost of nuclear fuel required in a nuclear electric power generating plant.

It is also an object of the invention to achieve the primary object by suppressing the effects of xenon poisoning on reactor reactivity.

It is another object of the invention to achieve the previous objects by varying the loading on the reactor after 100% power can no longer be maintained at equilibrium.

It is yet another object of the invention to achieve the previous objects while maintaining 100% power during the major portion of the daily operating cycle.

It is an additional object of the invention to achieve the previous objects by operating the reactor at reduced power during part of the day and by reducing the reduced power level on successive days.

It is still another object of the invention to reduce the power level during the reduced power periods only to the maximum reduced power required to be able to operate at 100% during the high power level period.

It is also an object of the invention to achieve the previous objects by periodically predicting the maximum reduced power level as a function of present reactor flux and a predetermined daily loading schedule.

Other objects will become evident from a reading of the summary of the invention and detailed description of the preferred embodiment of the invention, which follow.

SUMMARY OF THE INVENTION

According to the invention, a nuclear reactor supplying the thermal energy for a steam turbine electric power generating system is forced to follow a load cycle which sets up an oscillation in the xenon poisoning. The xenon and iodine time constants are such that the xenon oscillation is approximately in antiphase with the power; that is, peak xenon occurs while the reactor is at low power, and the xenon concentration is below the equilibrium level while the reactor is at full power. With such a cycle, the reactor can still achieve full power for a considerable part of each day, even beyond the normal end of the full cycle when equilibrium full power can no longer be sustained.

Specifically, a negative power coefficient nuclear reactor supplying the thermal energy for a steam turbine electric generating system is operated, when 100% can no longer be maintained at equilibrium due to xenon poisoning, by dividing the operating time into intervals. In the preferred embodiment, each interval is a 24-hour period. The reactor is operated at a high power level during a first portion of each interval. During a second portion of the interval the reactor is operated at a reduced power level which is selected such that the xenon level is suppressed and 100% power can be maintained for at least a substantial part of the first portion of the next interval. During each subsequent interval the reduced power level is further reduced until the reduced power level reaches a minimum level and the reactor is shut down for refueling. Preferably, this minimum power level corresponds to the reactor lower thermal limit. If desired, once the reduced power level has been reduced to the preselected minimum level, instead of shutting down the plant, operation can be continued by maintaining the reduced power level at the selected minimum value and the daytime power can be reduced each day until a predetermined level of burnup is reached.

Typically, the reactivity of a large PWR under load declines about 0.03% per day. Under these conditions it is necessary, once the excess reactivity has been used up, to suppress the xenon by about 1% each day in order to be able, at least part of the time, to operate at 100%. A 1% reduction in xenon poisoning requires about 3% reduction in nighttime power. Therefore, in a representative PWR plant utilizing the present invention, the reduced power level is reduced 3% per day. Since the lower thermal limit in a typical PWR is reached at about the 25% power level, it can be appreciated that the xenon suppression scheme can be applied for about 25 days.

Preferably, at the conclusion of each operation at reduced power, the power is ramped up to the 100% power level. This practice minimizes mismatches between power available and demand during the final days of xenon suppression. In addition, the power may be ramped down to the reduced power level at the appropriate instant. Hence, xenon suppression as described herein is compatible with any number of the standard power cycles used by utilities.

As another aspect of the present invention to be used in place of lowering the reduced power level by a fixed amount each day, a continuous determination can be made of the maximum reduced power level that will still allow operation at 100% power at a selected future time, i.e., the beginning of the next interval. In order to accomplish this, the present and future levels of xenon in the reactor must be determined. The present xenon level can be determined from the measured reactor neutron flux using known differential equations which include a continuous determination of the iodine concentration since, as mentioned above, the major portion of the xenon is a product of decay of the iodine. The future xenon concentration is a function of the future reactor flux which, in turn, is directly proportional to the load to be carried by the reactor. Hence, the future xenon level, up to the beginning of the next interval, can be determined using the same differential equations, but substituting the future load to be carried by the reactor for the real time measured reactor flux. The present xenon and iodine levels are used strictly as the initial conditions for the integrations which are carried out to solve the differential equations for the future xenon level.

The determination of the future xenon level requires real time for calculation but is carried out on a highly compressed time scale. The future xenon level signal is converted to a reactivity signal by suitable scaling and when the beginning of the next interval is reached on the compressed time scale, the value of the reactivity signal is stored as representative of the predicted reactivity at this selected point in the future. The predicted reactivity is then compared with a target reactivity selected to permit operation of the reactor at the selected future time at substantially 100% power, and the difference is used to generate a reduced power signal. This reduced power signal represents the maximum reduced power level that the reactor can be operated at during the second portion of the current interval and still attain substantially 100% power at the beginning of the next interval.

The reduced power signal is fed back for use in the determination of the future load. A selected load cycle, such as one of the standard utility load cycles or some modification thereof, is also used in this determination. For instance, the reduced power signal can be used as representative of the future load during the second, reduced power portion of each interval while the selected load cycle is used during the remainder of the interval. Preferably, a representation of the selected load cycle is stored and the stored representation is scanned on the same compressed time scale as used in determining the future xenon level to generate an instantaneous selected load signal. This signal is compared with the reduced power signal with the larger signal being selected as the future power signal. In the preferred embodiment, the reduced power portion of the selected load cycle is set at a level corresponding to the lower thermal limit of the reactor such that the unit will not be operated below this level regardless of the value of the calculated reduced power signal.

The generating of the reduced power signal is carried out repetitively and continuously with each successive iteration converging the predicted reactivity toward the target reactivity. The scanning of the selected load cycle and the generation of the predicted reactivity signal are synchronized by a counter. The invention encompasses both the method and apparatus for generating this maximum reduced power signal.

BRIEF DESCRIPTION OF THE DRAWINGS

FIG. 3 is a graphical representation of an example of the power generated by a plant such as that shown in FIG. 1 when operated in accordance with the teachings of the present invention;

FIG. 6 is a graphical representation of the applicaton of the present invention to an alternate form of load schedule;

DESCRIPTION OF THE PREFERRED EMBODIMENT

Figures 1, 5:
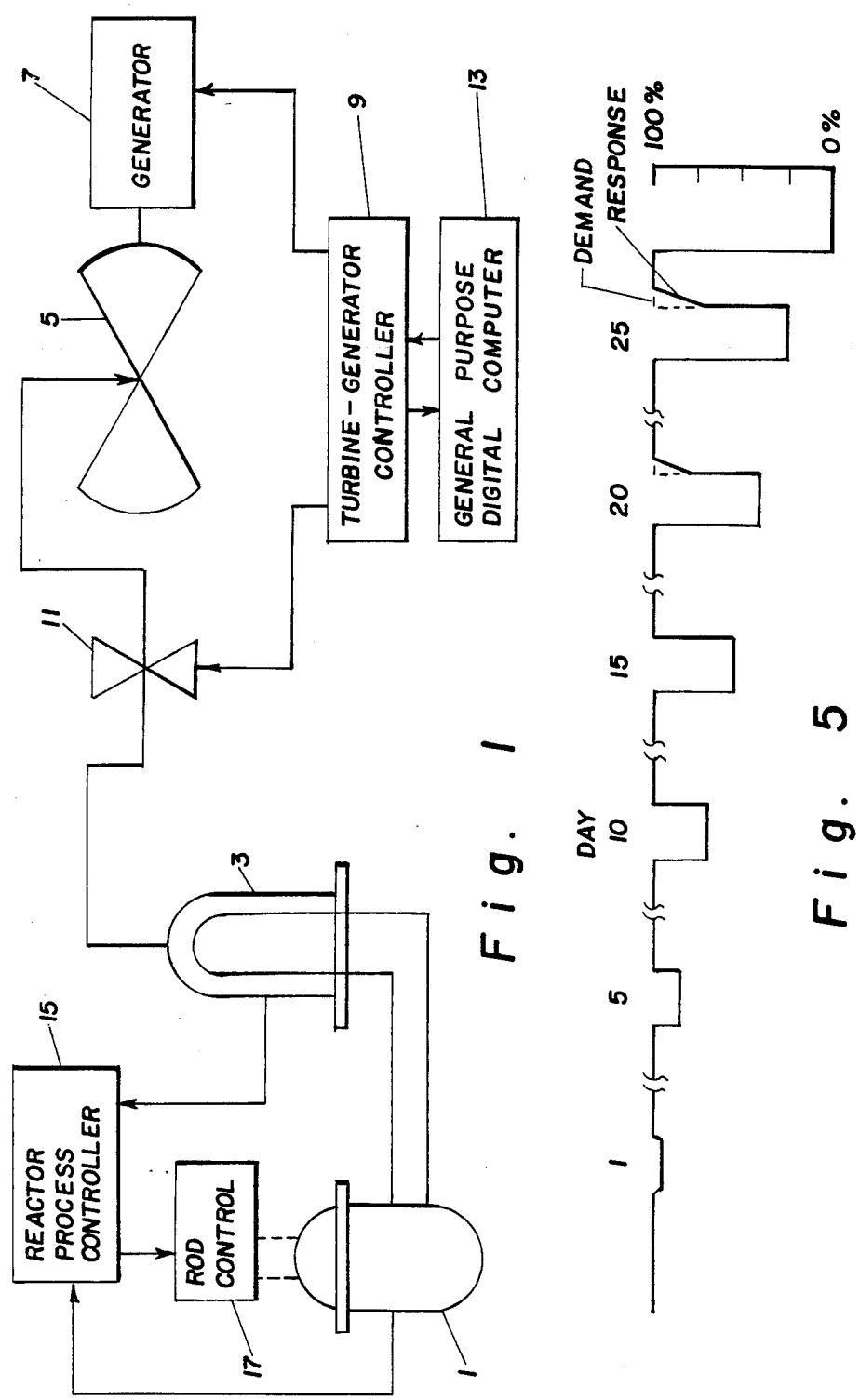
FIG. 1 is a schematic diagram of a pressurized water reactor (PWR) nuclear power generating plant to which the present invention is applied.
FIG. 5 is a graphical diagram illustrating the application of the present invention to a typical load schedule employed by utilities.

The invention will be described as applied to a pressurized water reactor (PWR) electric power generating system, although the invention is also applicable to other nuclear power generating systems having a negative power coefficient. In the PWR system illustrated in FIG. 1, thermal energy developed by the reactor 1 is used to generate steam by circulating the reactor coolant through a steam generator 3. The steam is then utilized to drive a turbine 5 which powers an electric power generator 7. The flow of steam to the turbine 5 is controlled by a turbine generator controller 9 through control valve 11. The controller 9 also regulates the output of the generator 7 and is preferably a digital controller such as the Westinghouse Digital Electric Hydraulic (DEH) Controller. A plant general purpose computer 13 monitors the operation of the turbine generator controller 9, provides the controller with operating parameters, and performs a number of housekeeping chores in a manner well known in the art. A reactor process controller 15 in response to signals from the reactor 1 and steam generator 15 provides control signals to the rod controls 17 which position the control rods in the reactor to regulate the operating level of the reactor 1.

In applying the invention to the system of FIG. 1, the controller 9 regulates the load imposed on the generator 7 and correspondingly regulates the flow of steam to the turbine 5 to suppress the xenon poisoning when the reactor 1 can no longer be run at 100% power at equilibrium. This is achieved by operating the reactor at reduced power for part of the day and is effected by lowering the load imposed on the generator which, in turn, calls for less steam for the turbine. The reduction in the requirement for steam results in a rise in the temperature of the reactor which lowers reactor reactivity to that required to sustain the reduced load imposed on the system. The reactor controller can then be operated manually by the operator, or automatically, to reposition the control rods to adjust the operating temperature at the new power level to a desired setting within preset limits.

Figure 2:
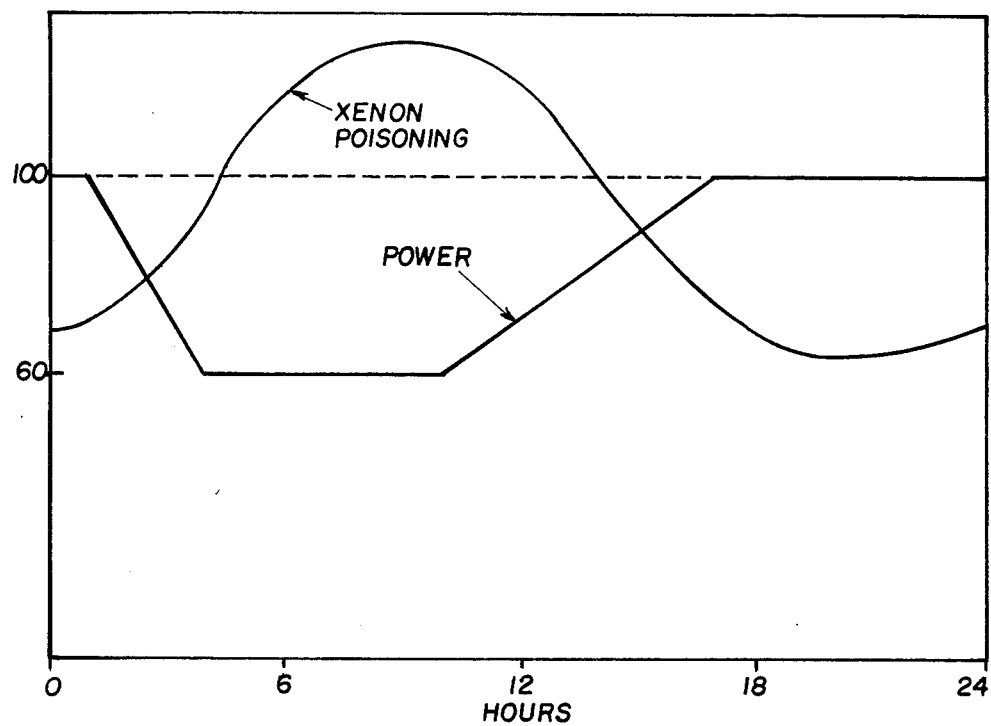
FIG. 2 is a graphical representation of the relationship between the power level of the reactor of FIG. 1 and the concentration of xenon.

FIG. 2 illustrates the principal of operation of the invention. Although some xenon is formed directly during the operation of the reactor, most of the xenon results from the decay of iodine 135, which is itself formed directly by fission. While the xenon itself will eventually decay into non-neutron absorbing daughters, a large portion of the xenon is eliminated through the absorption of neutrons generated during reactor operation. Thus, when the reactivity level of the reactor is lowered so that less xenon is eliminated through neutron absorption but xenon continues to be formed at a high rate through decay of the iodine 135, the level of xenon in the reactor rises substantially although not to a level which would preclude operation at the reduced power level.

Subsequently, as the reactor continues to operate at the lower power level, the xenon concentration will fall as the buildup of iodine decays into xenon and the xenon itself decays without the replacement of the xenon and iodine at a high rate. If as shown in FIG. 2, the reactivity of the reactor is again raised, the buildup of xenon will lag behind. Thus, by judiciously adjusting the power level of the reactor, the xenon poisoning can be caused to oscillate at a rate which is out of phase with the desired power level. The time constants of the reactions are such that by lowering the power level for a period of about six hours or more, the reactor can sustain power levels above those that could be maintained at equilibrium for a substantial period of the remainder of the day. Such a pattern can be made fully compatible with the demands placed on the typical power generating system wherein the nighttime loads are substantially lower than the daytime loads. It is especially compatible with those systems in which the nuclear generating capacity is at a level where some of the nuclear plants must be used in load following and frequency regulation. In these systems, the plant reaching the end of its fuel cycle can, to some extent, load follow to suppress the xenon poisoning while the other nuclear plants are base loaded.

It is useful at this point to define one hundred percent suppression as the reduction of xenon poisoning to a level where it has a negligible effect on reactor operation. This could be achieved, for instance, by operating the reactor briefly at power and then, before significant xenon is formed, shutting down the reactor and allowing the xenon formed to decay away before the next period of power. However, as an example of such a cycle, the reactor would be operated at power for 5 hours and 240 hours would then be required for the decay of the xenon before power is resumed. Such a cycle is not practical, yet it is perfectly feasible to achieve 20 to 25% xenon suppression, as will be shown below.

It is contemplated in the preferred embodiment of the invention that the reactor be run at 100% power continuously until full power can no longer be maintained at equilibrium due to xenon poisoning. As shown in FIG. 3, this would occur after about 285 days in a typical 1000 MWe PWR in which one third of the core is replaced with 28 tons of fuel each fuel cycle. From this point on, the reactor is run at reduced power at night. In the example shown, reduced power is maintained for 12 hours each night. With each subsequent day, it is necessary to lower the reduced power level further at night in order to be able to maintain 100% power during the remainder of the day. Since the reactivity of the reactor declines about 0.03% per day, a 1% reduction in xenon poisoning makes available the additional reactivity required to operate the reactor at 100% for 12 hours for one more day. In order to achieve a 1% xenon suppression, the nighttime power must be reduced by about 3%. Thus, on the 286th day the power is reduced to 97% for the 12-hour nighttime period, and on the 287th day the reduced power is set at 94%, and so forth. The power is reduced in this manner 3% each day until the desired minimum nighttime thermal limit is reached which, in the example given, is 25% of full power and occurs on the 310th day.

Figure 4:
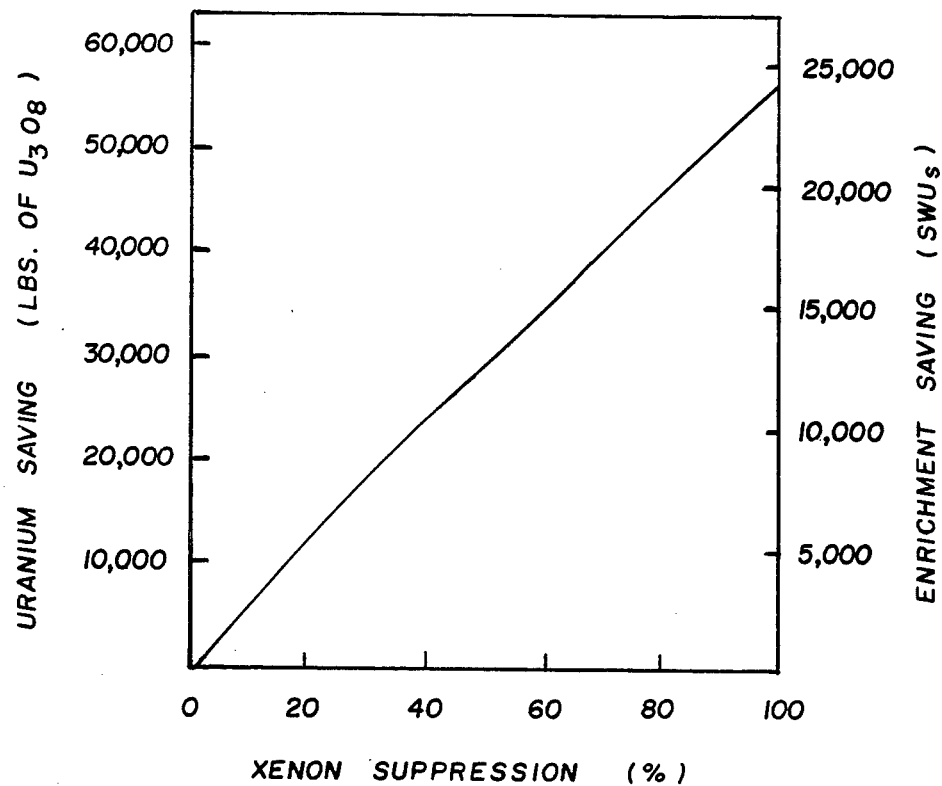
FIG. 4 is a graphical representation of the savings in uranium or in enrichment that can be realized in accordance with the teachings of the invention as a function of the percent of xenon suppression.

The reactivity gained through xenon suppression provides the opportunity either to extend the fuel cycle duration for the same enrichment or to lower the fissile inventory required for the same cycle length. Because of restrictions on burnup, it is more desirable to concentrate on the second alternative of lowering the fissile inventory. This can be accomplished either by using less uranium of a given enrichment or lowering the enrichment of the same amount of uranium. FIG. 4 illustrates the relationship between the percent of xenon suppression and either the uranium reduction or enrichment reduction available for the stated assumptions. Roughly, a 0.004% enrichment reduction can be achieved for each percent of xenon suppression. At the current level of costs, a savings of over $1 million can be achieved per fuel cycle with 25% xenon suppression realized with the example shown in FIG. 3.

Of course, operation of the nuclear plant at less than 100% power for part of the day reduces the return that is generated on the large capital investment. However, generally the rate charged for power at night is less than that charged in the daytime. Most importantly, however, even assuming the 12-hour nighttime period of successively reduced power illustrated in FIG. 3, the average power level over the xenon suppression period is over 80% and the cycle will last less than five days longer than it would have, had the enrichment not been reduced and had the plant been maintained at full power at night. For a six-hour nighttime period of reduced power, the average power level exceeds 90% and the fuel cycle prolongation is less than three days. Any adverse impact on plant economics due to operation for the last three weeks of the fuel cycle at reduced power levels for part of the day to suppress the xenon poisoning is therefore not great.

The present invention is easily adaptable for use with the load schedules used by the power companies for load following. Generally, they use more or less standard patterns such as, for example, a square wave pattern of 12 hours at full power and 12 hours at a reduced power level assigned to the given plant. The demand schedule shown in FIG. 3 follows this same pattern, except that the reduced power level is lowered 3% each night instead of following the system load. The PWR can follow such a 12-hour square wave demand schedule daily until the reduced power level drops below about 70%. After this, there is a slight mismatch at the beginning of the full power period as illustrated in FIG. 5, but the system recovers quickly. This mismatch increases daily until on the last day, when the reduced power level is 25%, the mismatch averages 16% over three hours. While not ideal, such a mismatch may be tolerable for many utilities. Another common load schedule is a square demand wave with a six-hour nighttime period. With this schedule there is also a sizable mismatch at the beginning of the daytime period over the last few days of the fuel cycle.

Many utilities employ load-up power ramps in the morning and conversely ramp the power down in the evening. Under one such schedule, the plant is operated at full power for 12 hours, is then ramped down over a three-hour period to a nighttime level, and is run at that nighttime level for six hours before being ramped back up to full power over a three-hour period. The application of the present invention to such a load schedule is illustrated in FIG. 6. Since this demand schedule has no square corners, it can be followed more faithfully, with a morning mismatch becoming noticeable only in the last few days. Another common demand schedule is a 10-4-6-4 cycle which can be followed until the end with minimal mismatch.

Figure 7:
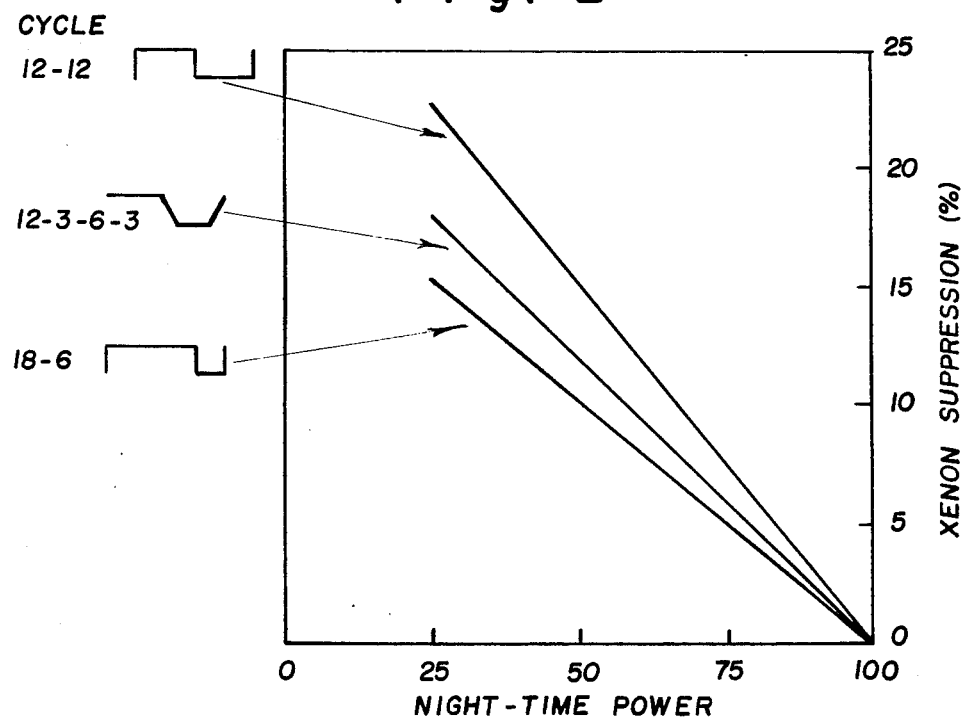
FIG. 7 is a graphical representation of the effects of the present invention using various nighttime power levels.

The present invention may easily be applied to other demand cycles. Some general observations are that, given the slow xenon rate of change, power variations over an hour have a negligible effect on the subsequent xenon transient, a sharp morning upramp is more likely to lead to mismatch between demanded and achieved outputs than are the more gentle upramps of the 12-3-6-3 cycle shown in FIG. 6 and the 10-4-6-4 cycle. Not all of the standard power cycles are equally effective in suppressing xenon. A cycle with a brief nighttime period is less effective than one with, say, a 12-hour nighttime period. A relative comparison of three cycles is illustrated in FIG. 7, which illustrates the amount of xenon-suppression that can be achieved as a function of reduced power for each cycle.

Xenon suppression is entirely complementary with intentional stretchout wherein the maximum power level of the plant is reduced daily in order to reduce the enrichment required. This combination may be attractive to utilities not needing daytime full output near the end of the fuel cycle. In this case, xenon suppression is applied first until the nighttime power is reduced to, say, 25%, then the daytime power is reduced by an amount equivalent to the daily loss of reactivity, for example, about 3% per day, as long as desired or until fuel burnup limits are reached while maintaining the nighttime power level at 25%. For the same fuel burnup, a lower feed enrichment may then be used.

In applying the invention to the power plant illustrated in FIG. 1, the general purpose computer 13 is utilized to generate the appropriate load schedule which is then provided to the turbine-generator controller 9. It will be assumed, for purposes of illustration, that the load schedule of FIG. 6 is employed; that is, a 12-3-6-3 cycle. Specifically, it will be assumed that the plant is run at full power during the day, that the power is ramped down at 9:00 P.M., is run at reduced power from midnight to 6:00 A.M., and is then ramped back up to full power. For ease of calculation, a 24-hour clock is used, thus 9:00 P.M. becomes 21 hours.

Figure 8:
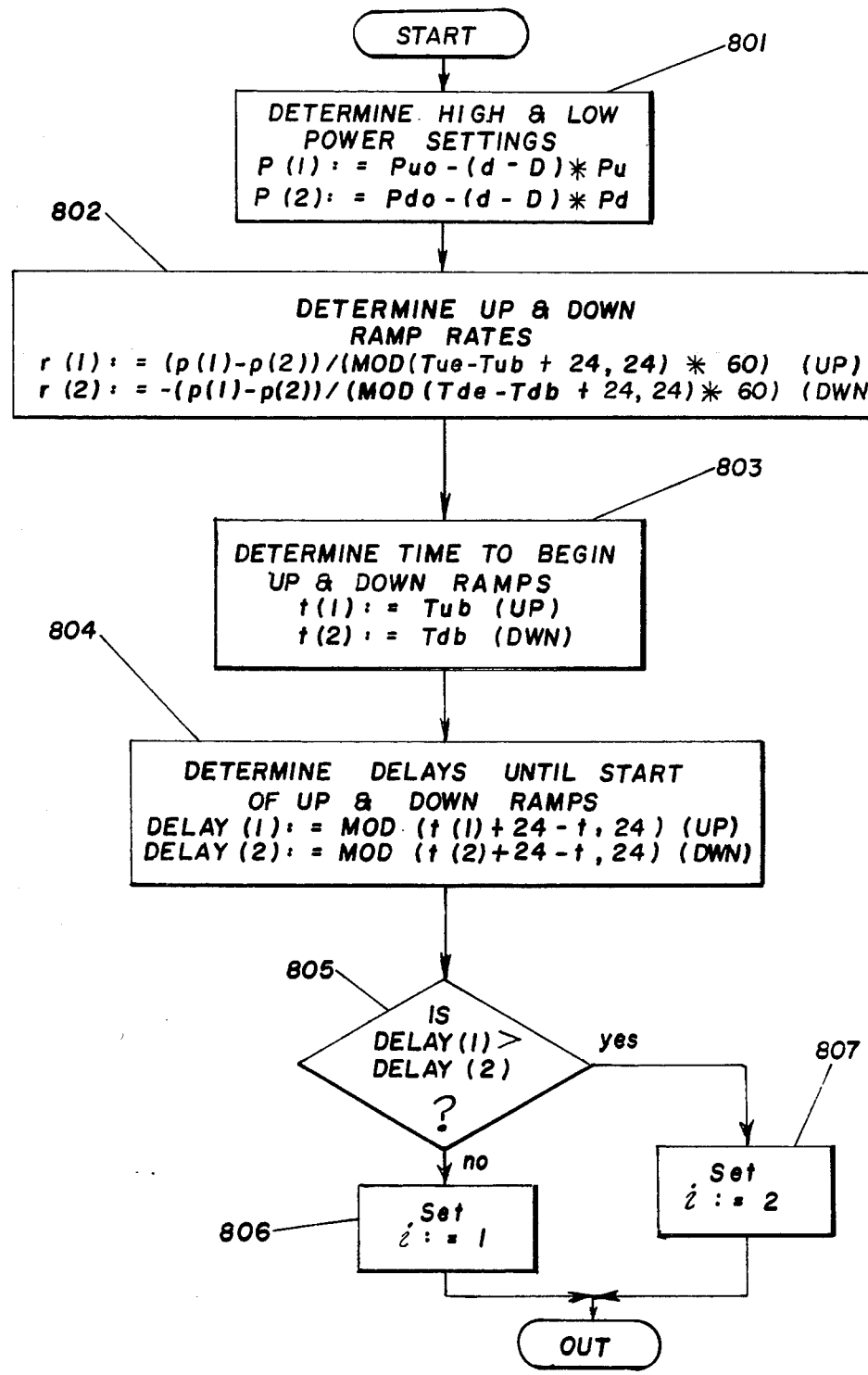
FIGS. 8 and 9 are flow charts of portions of a computer program incorporating the teachings of the invention.

In providing overall direction to the operation of the plant, the operator supplies the following parameters to the general purpose computer:

Tdb: Time (hour) to begin down ramp
Tde: Time to end down ramp
Tub: Time to begin up ramp
Tue: Time to end up ramp
Pd: % minimum power to be lowered each day
Pu: % maximum power to be lowered each day
Pdo: minimum daily power of day D-1
Puo: maximum daily power on day D-1
D: day on which to start xenon suppression With the selected values for each of these parameters entered into the computer, an initialization program is run at the start of each day and may be bid at midnight or on demand. A flow chart of this program is shown in FIG. 8. As indicated in block 801, the maximum and minimum power setting for each day are determined by multiplying the daily power reduction factor by the number of days since xenon suppression began and subtracting the resultant from the power level prior to xenon suppression. While the program is designed to be flexible and will accommodate reductions in both the maximum and minimum power levels, in the preferred form of the invention Pu is set equal to zero so that the maximum power level remains at 100%. Where 1% xenon suppression is applied each day, Pd is set equal to 0.03 so that the minimum power level is reduced daily by 3%. Of course, as discussed above, the maximum power level could be reduced daily during stretch out following the xenon suppression scheduling. It is also possible that the maximum level could be reduced daily during xenon suppression.

Next, the rates at which the power is to be ramped up and down are determined as indicated in block 802. These rates are calculated by dividing the change in power to be effected by the time period over which the change is to take place. The quotient is then divided by 60 to convert the result into percent change per minute. In the example chosen, the up rate, r(1), on the first day in which a 3% reduction in power is made over a three-hour period is equal to 0.000166. The divisor is expressed in modular form to accommodate for ramping action which might extend over midnight. Under such notation, 24 is added to the difference between the start and finish of the ramping action, but 24 is subtracted from the resultant if it exceeds 24. Thus, if the ramping action was commenced at 22 hours (10:00 P.M.) and concluded at 01 hours (1:00 A.M.), r=(1−22+24)=3, whereas if the ramping action began at 6:00 and ended at 9:00, r=(9−6+24)=27−24=3.

The next step, as indicated in block 803, is to set t(1) and t(2), the times to initiate the up and down ramps, respectively, equal to the times Tub and Tdb provided by the operator. Normally these times would remain the same each day. Following this, a determination is made as to the times that must elapse before each of the ramp functions is initiated. As indicated in block 804, this determination is made as a function of the real time, t, and is stated in modular form to accommodate again for events which may not occur until the next day.

Finally, a determination is made in block 805 as to which ramp function is the next in time to be implemented. If the up ramp is next, an operator, i, is set equal to 1 as indicated in block 806. If the down ramp is next, i is set equal to 2 as shown in block 807.

Figure 9:
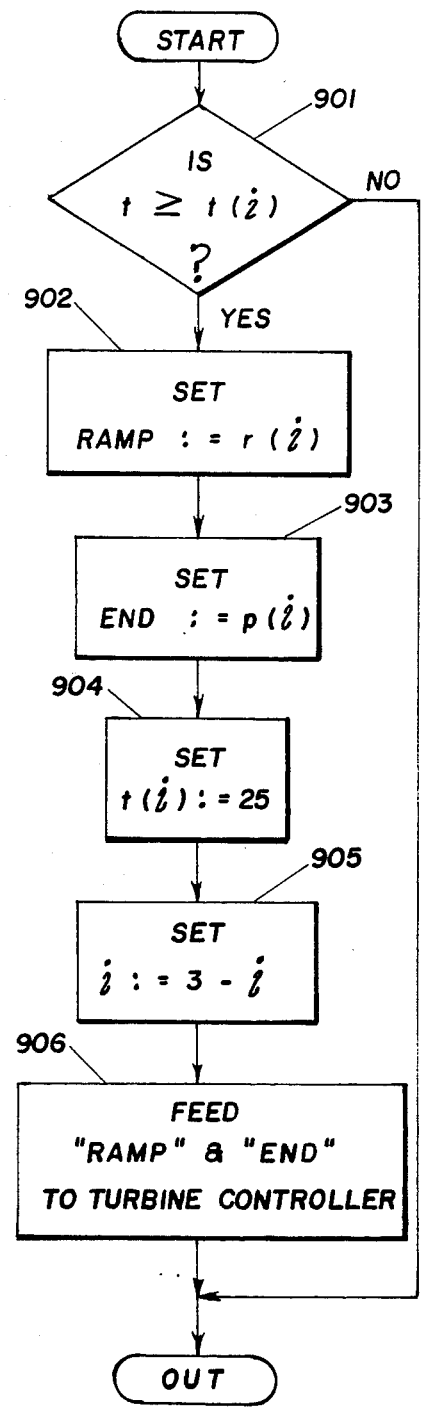

Following initialization, the operating program shown in flow chart form in FIG. 9 is run every 10 minutes throughout the day. Each time this program is run, a check is made in block 901 to see if the real time is equal to or greater than the time set for the next ramping function. In the format used, t(i) is equal to time t(1) for an up ramp or t(2) for a down ramp. If the time for the next ramp has not arrived, the program is exited. If it has, a memory location "ramp" is set equal to the ramping rate for the ramp function to be implemented, as shown in block 902, and another memory location "end" is set equal to the level to which the power is to be ramped as indicated by block 903. Next, as shown in block 904, t(i), the time at which the ramping function being implemented is to be initiated is set equal to 25. This step assures that only one up and one down ramp will be executed in each 24-hour period. The operator i is then set equal to the other value in block 905, so that the next time through the program the time, rate, and end power level associated with the other ramp function will be considered. Finally, in block 906 the values stored in "ramp" and "end" are fed to the turbine-controller 9 which carries out the ramp command at the appropriate time and accordingly sets the power level imposed on the plant to the new level commanded.

While the above scheme of xenon suppression has been illustrated as carried out in part by a general purpose digital computer, it will be apparent to those skilled in the art that those functions performed by the computer are relatively simple and could be performed alternatively by hardware or even through manual inputs to the turbine-generator controller 9 by the station operator.

Operating a nuclear power plant by forcing it to follow a daily load cycle with a nighttime reduced power level which is stepped down by fixed increments each night very adequately provides the additional reactivity needed to operate the plant at 100% power during the day for about three weeks beyond the time when the reactor could be operated at 100% at equilibrium. It is desirable, however, because of the high capital investment in the nuclear plant, to reduce the power only the minimum amount required each night that would still permit 100% power to be achieved during the day. It is also desirable to avoid any mismatch, such as those discussed above, when coming back up to full power, and to be able to accommodate for deviations from the daily load cycle due to other influences on reactor output. We have found that such control can be effected by a xenon suppression controller which regulates the power program between the present time and a pre-established future time based upon historic and present measured reactor parameters.

Due to the time constraints involved, the anticipitory action must be sustained over an extended period of time. More specifically, iodine 135 and xenon 135 have been observed to follow the following models (Weinberg & Wigner Physical Theory of Neutron Chain Reactors, University of Chicago Press 1958, page 601).

$$dI/dt = \gamma_I \Sigma_f \phi - \lambda_I I \qquad \text{Equation (1)}$$

$$dX/dt = \gamma_x \Sigma_f \phi + \lambda_I I - \lambda_x X - X\sigma\phi \qquad \text{Equation (2)}$$

where:

I, X—are iodine and xenon concentrations, respectively $\gamma_I \gamma_x$—are fission yields of iodine and xenon $\phi$—is the neutron flux level $\Sigma_f$—is the macroscopic fission cross section $\sigma$—is the xenon absorption cross section $\lambda_I \lambda_x$—decay constants for iodine and xenon The neutron flux, $\phi$, is readily measured in a power reactor land is proportional to power output. The parameters $\gamma$, $\Sigma_f$ and $\sigma$ are readily determined for a reactor, but are not measured directly. They vary little over power level and time. I and X are variable and are not measured. It is necessary to compute I and X as a function of historic time up to the present, and separately to compute I and X over a future period on an accelerated time scale.

To implement this scheme of xenon suppression it is necessary to characterize the planned daily cycle and allow one parameter, usually the overnight or reduced power level, to be controlled by the xenon controller. It is important that the controller forecast this parameter as well as control it, so that the grid dispatcher can accommodate for the reduced power level by adjusting the load of the other units in the grid.

Figure 10:
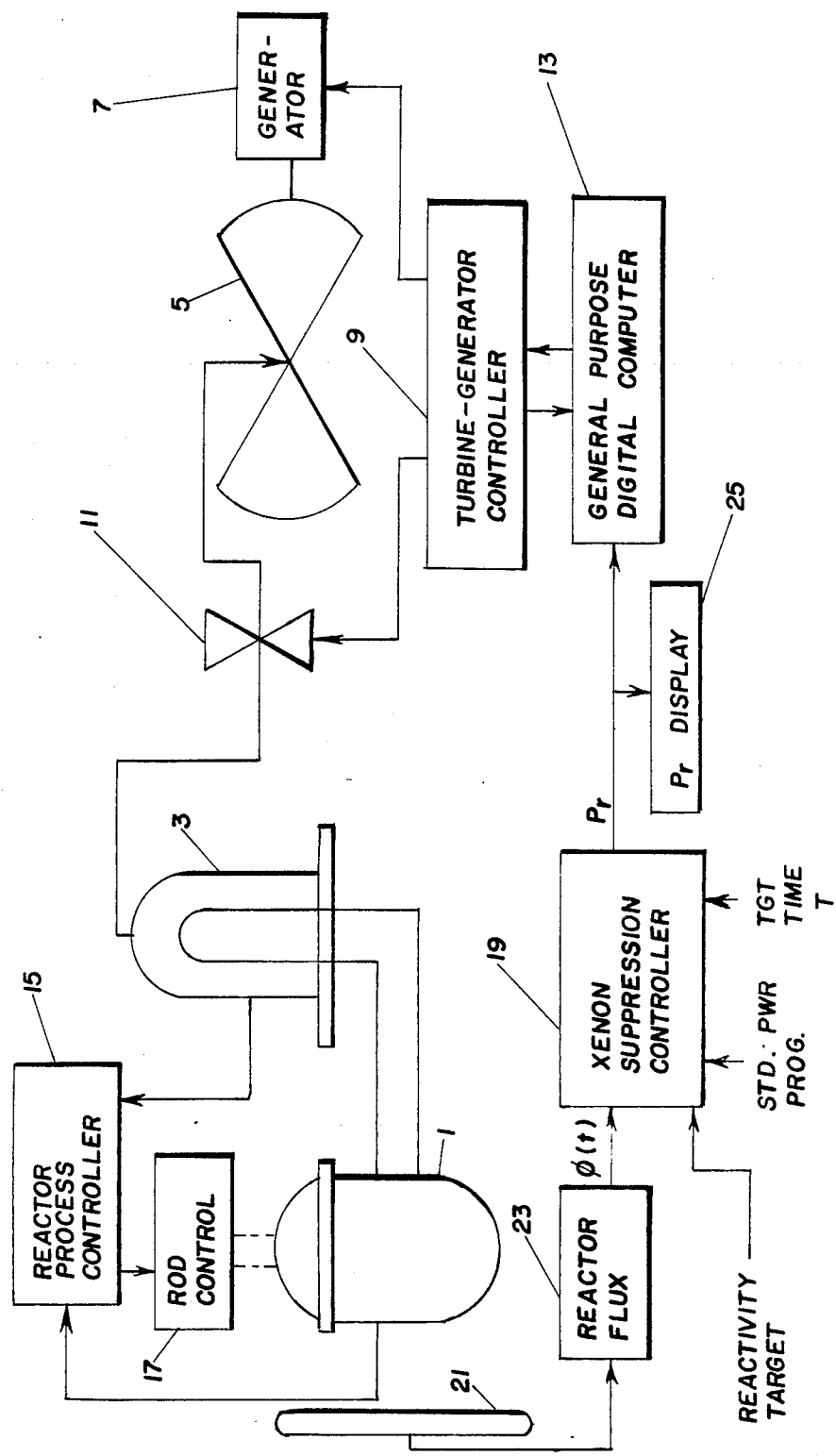
FIG. 10 is a schematic diagram of a PWR nuclear power generating plant to which an alternate form of the invention has been applied.

FIG. 10 discloses a schematic diagram of a PWR electric power generating plant to which this alternate form of the invention has been applied. The basic system operates in the same manner as described in connection with the plant shown in FIG. 1 and like components are given identical reference characters. As in the case of FIG. 1, the turbine-controller 9 operates the control valve 11 to regulate the flow of steam to the turbine 5 and thereby control the load carried by the generator 7. In addition to the components of FIG. 1, this modified system includes a xenon suppression controller 19, a reactor neutron flux transducer 21 and indicator 23, and, optionally, a display 25. The flux indicator 23 supplies to the xenon suppression controller 19 a continuous signal $\phi(t)$, representative of the neutron flux level in the reactor 1 as measured by the transducer 21. The controller uses this real time flux signal and several signals supplied by the operator to generate the nighttime reduced power level $P_r$. The signals supplied by the operator include the reactivity target (daytime power level), target time T (the time that the reactivity is to reach the target value), and the standard power curve that it is desired that the plant follow.

The signal $P_r$ generated by the xenon suppression controller may be used by the general purpose computer 13 as the signal p(2) (reduced power level) in the manner discussed above instead of reducing the nighttime power level a fixed amount each night. Alternatively, this signal $P_r$ can be supplied to the turbine-controller 9 manually by the operator. The display 25 permits the operator to monitor the reduced power level signal generated by the xenon suppression controller 19 whether or not the signal $P_r$ is used manually or automatically to set the turbine-generator controller.

Figure 11:
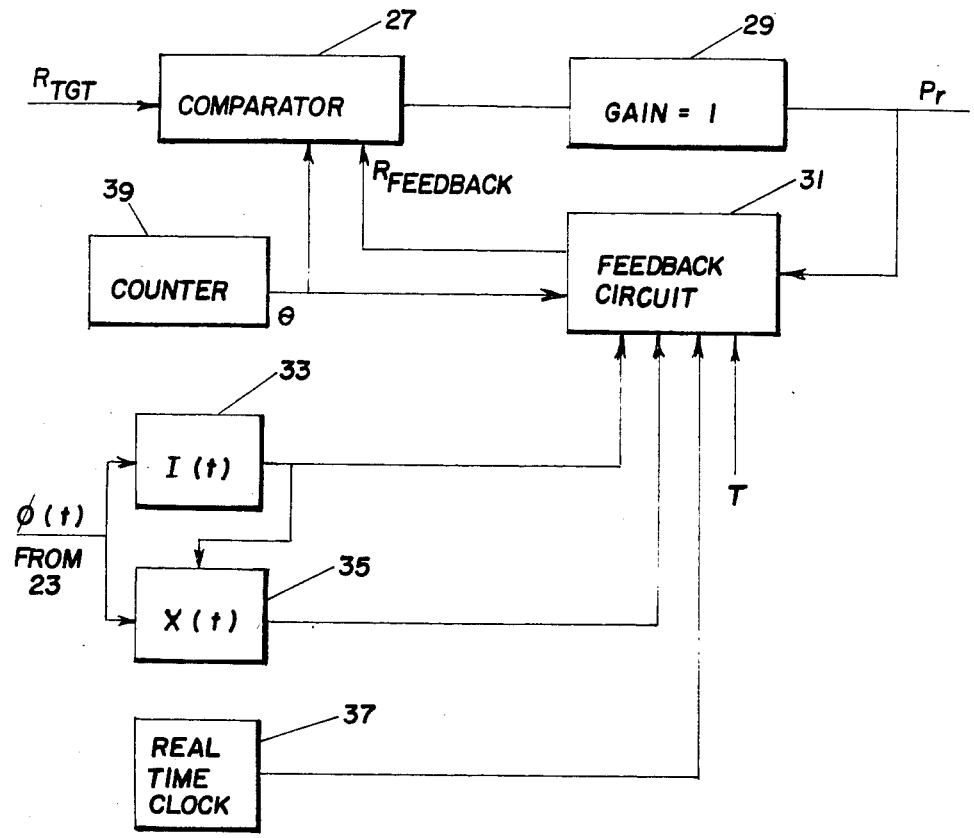
FIG. 11 is a schematic diagram in block form of a xenon suppression controller made in accordance with the teachings of the invention.

FIG. 11 illustrates in block diagram form the xenon suppression controller 19 of FIG. 9. Essentially it is a feedback controller with the set point the target reactivity $R_{TGT}$. This set point value is compared with a reactivity feeback signal $R_{feedback}$ (the predicted reactivity) in comparator 27 to generate the reduced power level signal $P_r$. The forward gain indicated by block 29 is 1. The signal $P_r$ is applied to the feedback circuit 31 to generate, in conjunction with other signals, the feedback reactivity $R_{feedback}$. The other signals applied to the feedback circuit 31 include the real time iodine 135 and xenon 135 concentrations generated in circuits 33 and 35, respectively, from the real time reactor neutron flux $\phi(t)$, a time signal from a real time clock 37, and the target time T supplied by the operator. The gain of the feedback circuit 31 is a prediction of the reactivity at a future point in time which necessarily requires real time to accomplish. Accordingly, the entire circuit must accommodate for delays in the gain of the feedback circuit, and hence the comparator 27 cannot be a simple differential amplifier. A counter 39 generates a signal $\theta$ which synchronizes the operation of the feedback circuit 31 and the comparator 27.

The xenon suppression controller of FIG. 11 runs continuously. The value of $R_{TGT}$ is changed as a step change infrequently, perhaps a few times a day but generally only once a day as the operator makes the adjustment in reactivity needed to maintain 100% daytime power. As discussed above, this requires about a 0.03% increase in reactivity each day. The parameter $P_r$ may change more frequently since other reactor parameters are input to the controller as well, and the controller responds to all these changes.

Figure 12:
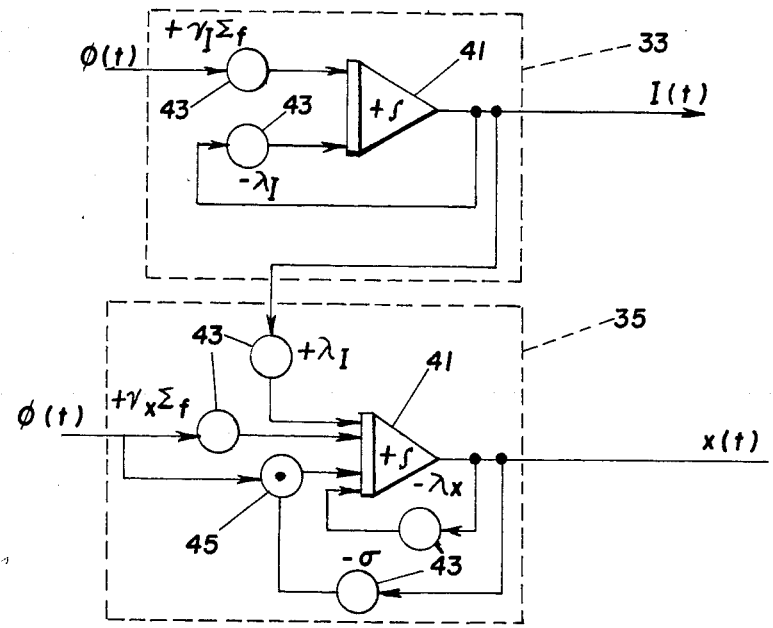
FIGS. 12, 13 and 14 are schematic diagrams of portions of the controller of FIG. 11.

The circuits 33 and 35 for generating the present time concentrations of iodine 135 I(t), and xenon 135, X(t), from the real time reactor flux signal $\phi(t)$, are shown in FIG. 12. These circuits solve the differential equations (1) and (2) above on a real time basis using non-inverting integrators 41, potentiometers 43, and a multiplier 45. The scalar multiples for the various potentiometers are indicated next to each unit in the figure. As will be noticed, the only input required for generating the present levels of iodine and xenon is the reactor flux $\phi(t)$.

As was indicated above, the gain of the feedback circuit of FIG. 11 requires predicting or forecasting of the iodine and xenon at a future point in time as continuators of the real reactor history. This forecasting must be carried out on a compressed time scale, but can be done easily because "time" only enters into the derivative term and, $df(t)/dt$, with the substitution of $t=S\theta$      Equation (3)

can be written $df(t)/d(s\theta)$      Equation (4)

or $df(t)/sd\theta$      Equation (5)

provided only that the scale factor of time compression, s, is a constant.

Figure 13:
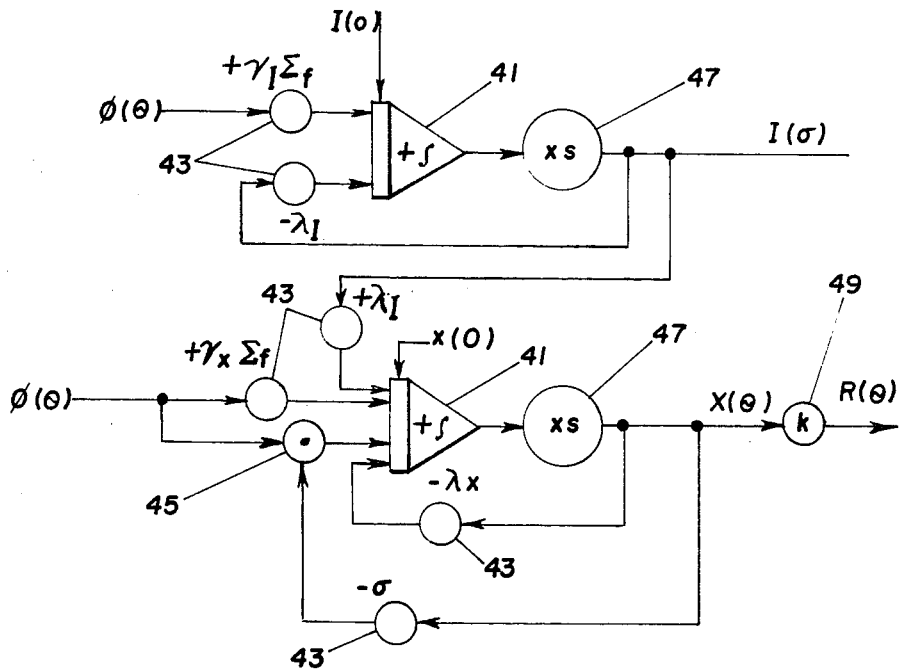

The xenon-iodine equations (1) and (2) have time constants on the order of six hours, or about 20,000 seconds. Compression of time by a factor of 10,000 imposes on the compressed time circuitry, time constants on the order of 2 seconds, a very workable time frame. FIG. 13 illustrates the analog circuits for generating the future xenon level in the reactor and from it the predicted reactivity of the reactor at that time. This circuit is the same as the circuits of FIG. 11 which use real time except for the amplifiers 47 in the integrator circuits which apply the time compression factor s and the potentiometer 49 which converts the projected xenon level to reactivity.

Since the circuit of FIG. 13 is intended to continue the true reactor history into the future, it is necessary to explicitly treat initial conditions for the calculations. The required initial conditions are shown in FIG. 13 as I(o) and X(o) and are applied directly to the integrators which generate the representations of the future iodine and xenon concentrations, respectively. It will be understood that the initial conditions for the future are the conditions prevailing at the time present. The generation of the representations of the present xenon and iodine concentrations in the circuits of FIG. 12 is solely for the purpose of producing initial conditions for the analyses of the future carried out by the circuit of FIG. 13. It will be noticed that the flux which serves as a continuing input to the circuit of FIG. 13 is identified as $\phi(\theta)$ since it is a projection of the future flux, not the measured reactor flux as in FIG. 12.

The output of the circuit of FIG. 13 is R(φ), the predicted xenon reactivity at a future time θ. The scalar constant K of potentiometer 49 which converts the future xenon level X(θ) to predicted reactivity R(θ) is given by:

$$K = \sigma/\Sigma_a \qquad \text{Equation (6)}$$

where σ, as before, is the xenon absorption cross section and $\Sigma_a$ is the total absorption cross section.

Figure 14:
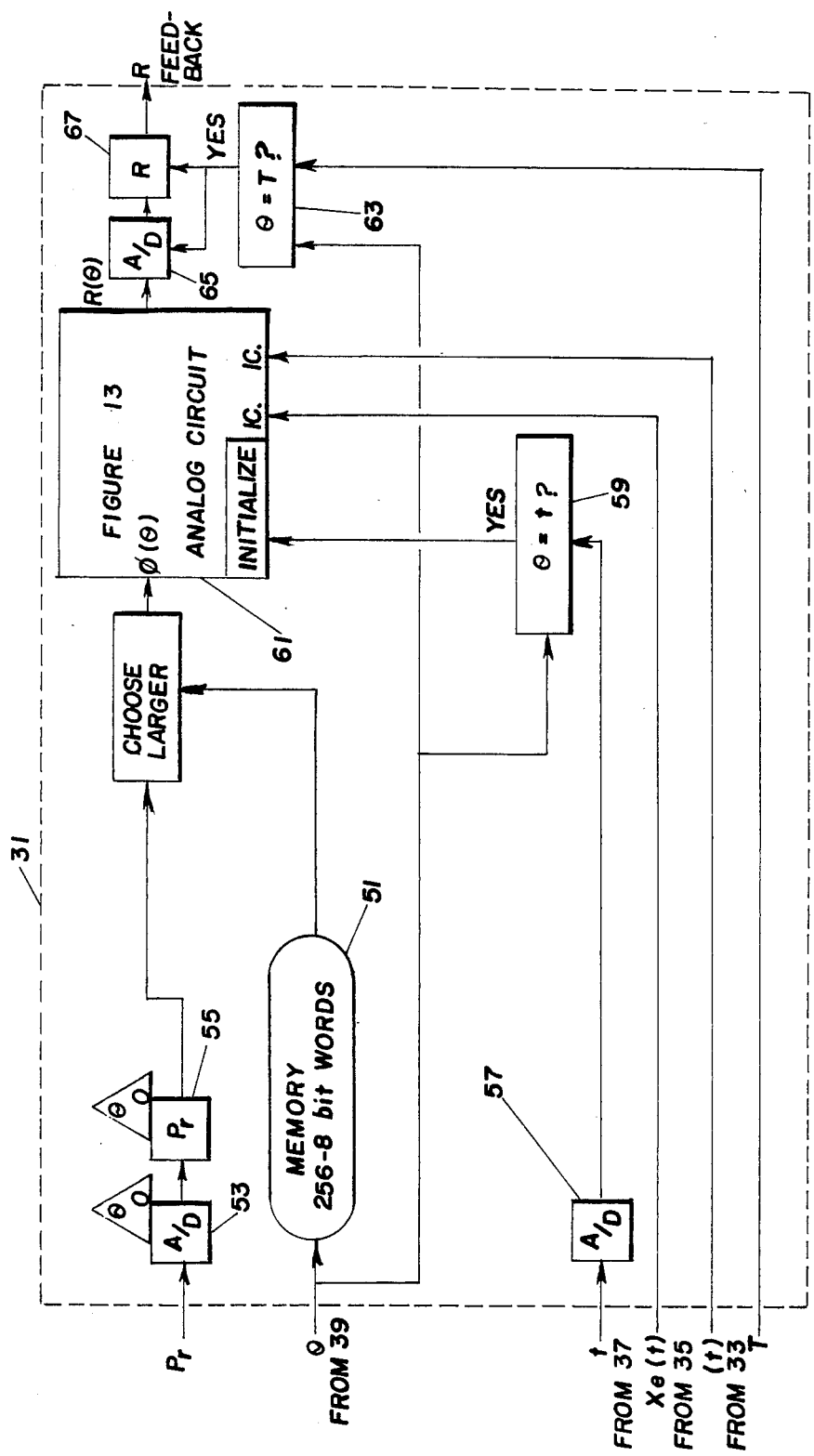

The circuit of FIG. 13 is activated by the circuit of FIG. 14 which starts the integrators running with the appropriate initial conditions and continuously feeds in the future flux levels φ(θ). As indicated, FIG. 14 illustrates the details of the feedback circuit 31 shown in block form in FIG. 11. Certain operations in the circuit of FIG. 14 are performed in response to signals, −θ, generated by the counter 39 shown in FIG. 11. This counter, which counts continuously from 0 to 255, is incremented at a fixed real time rate of 36 milliseconds (ms). This rate was chosen to correspond to the use of a scale factor of 10,000 in the circuit of FIG. 13. Variation in one can be accommodated by appropriate variations in the other. The θ signals generated by counter 39 represent the accelerated time scale used in forecasting the future xenon level. Certain of the operations to be carried out at specific counts reached by the counter are indicated in the figures by a triangle containing the symbol θ and the count on which the operation is performed.

Figure 15:
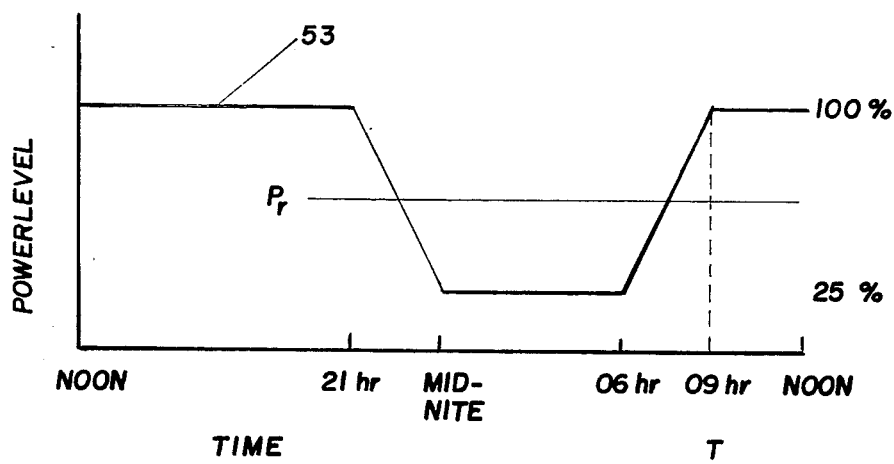
FIG. 15 is a graphical representation of a load cycle suitable for use with the controller of FIG. 11.

The feedback circuit of FIG. 14 includes an 8-bit, 256 word memory device 51. In this memory 51 is stored a standard power cycle for the reactor, with one memory word used to store a representation of the desired power level for each 6-minute increment of a 24-hour day. This utilizes 240 words of memory 51; the remaining 16 words are not used. The standard power curve may be a curve such as that illustrated in FIG. 15 quantitized for each 6-minute interval. In FIG. 15, the line 53 represents the power curve stored in memory 51. The reduced power called for by curve 53 occurs between midnight and 6:00 A.M. and is the lower thermal limit set for the reactor which, as indicated above, may be, for example, 25% of full load. The horizontal line, labeled $P_r$, is the latest reduced power level generated by the xenon suppression controller. This is the power level that the xenon suppression controller has determined the nighttime power must be set at in order that the target reactivity, $R_{TGT}$, can be attained at time T.

Returning to FIG. 14, at the count of zero by the counter 39, the latest value of $P_r$ is converted into a digital signal in analog to digital converter 53 and stored in memory 55. The stored signal is continuously applied to a choose larger circuit 57. In addition, at each of the first 240 counts of counter 39, the memory 51 applies a signal representative of the corresponding 6-minute segment of the standard load cycle to choose larger circuit 57. The larger of these two signals is selected by the circuit 57 for application to the analog circuit of FIG. 12 as the flux signal φ(θ). Thus it can be seen by reference to FIG. 14 that, as the counter sequences at an accelerated rate throughout the day, the flux φ(θ) follows the standard load curve until that curve drops below the controller reduced power value $P_r$. The flux φ(θ) then remains at $P_r$ during the simulation until the standard power curve again rises above $P_r$, whereupon the curve 53 is followed for the remainder of the forecasting sequence. In this manner, the nighttime power is only reduced the minimum amount necessary in order to be able to achieve 100% power at the time T. The $P_r$ level determined by the xenon suppression controller declines each day as the operator adjusts the target reactivity level to accommodate for the reduction in available reactivity. Near the end of the xenon suppression cycle the minimum power level set by standard power curve prevents the power level from falling below the minimum thermal limit.

The feedback circuit 31 also continuously compares in a comparator 59 the simulation time, as represented by the count θ of the counter 39, with the real time t from the real time clock 37 as digitalized by A/D converter 57. When the time θ in the simulation reaches the equivalent of the real time t, the comparator 59 sends an initializing signal to the analog circuit 61 which starts the integrators running with the real time iodine level I(t) from circuit 33 and the real time xenon level X(t) from circuit 37 inserted as the initial conditions.

With the initial conditions set at the real time values, the analog circuit runs through its simulation with the flux φ(θ) following the standard load cycle and reduced power level $P_r$ as described above, and generates a future reactivity level R(θ). When the simulated time, θ, reaches the target time, T, supplied by the operator, a comparator 63 activates an A/D converter 65 to convert the analog future reactivity R(θ) for the time T into a digital signal which is stored in memory 67. This stored digital signal is the predicted reactivity feedback signal $R_{feedback}$.

Figure 16:
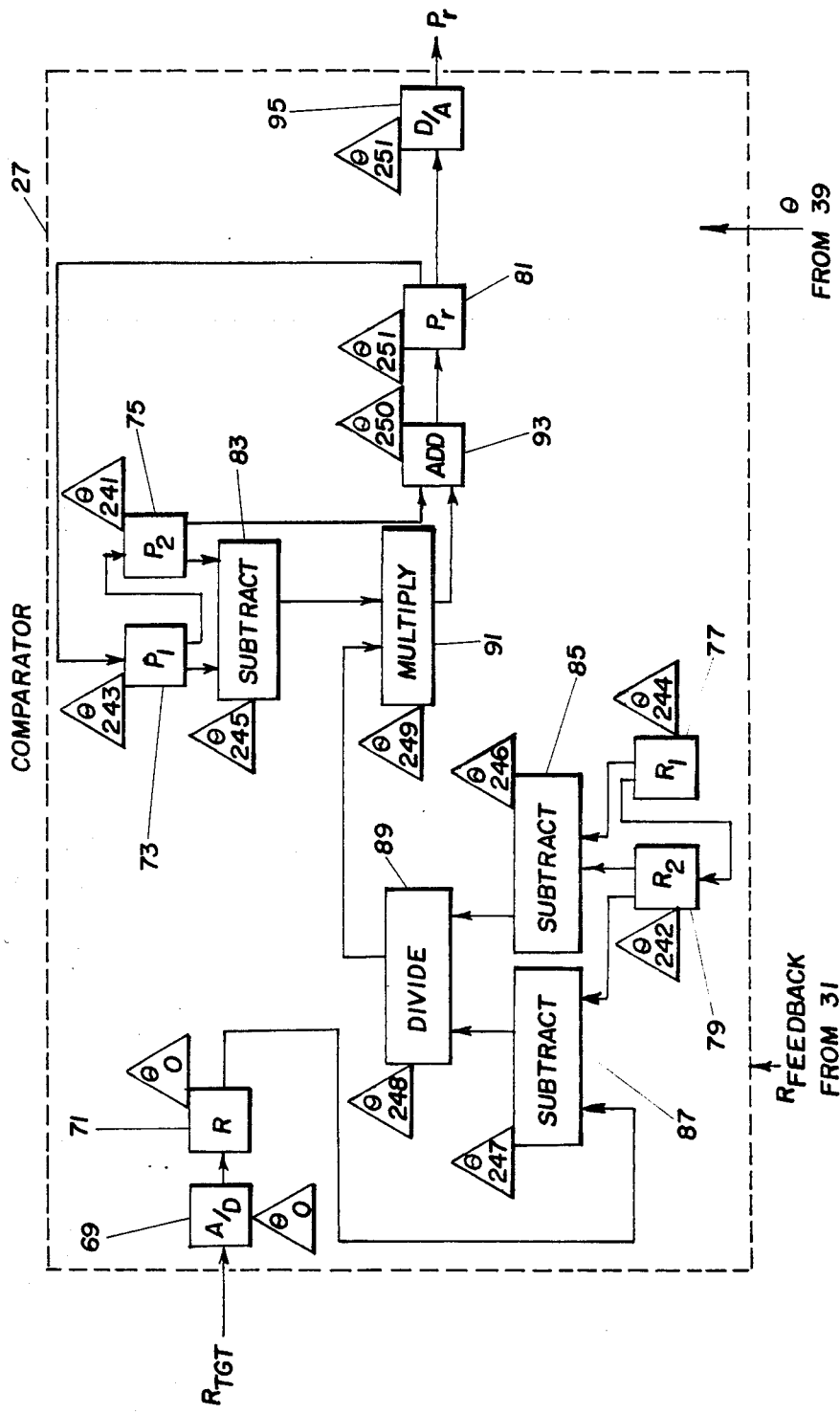
FIG. 16 is also a schematic diagram of a portion of the controller of FIG. 11.

The signal $R_{feedback}$ is compared with $R_{TGT}$ in comparator 27, which is illustrated in FIG. 16, to generate the reduced power level $P_r$. As previously mentioned, the comparator 27 is not a simple differential amplifier because real time is required to generate the $R_{feedback}$ signal and because the circuit uses the error between $R_{TGT}$ and $R_{feedback}$ to generate a revised value for $P_r$. The manner in which the circuit 27 accomplishes this can be explained more readily by reference to FIG. 17, where:

$R_1$ is the most recent $R_{feedback}$,
$P_1$ is the parameter $P_r$ value that lead to $R_1$,
$R_2$ is the next most recent $R_{feedback}$,
$P_2$ is the parameter $P_r$ value that led to $R_2$.

Figure 17:
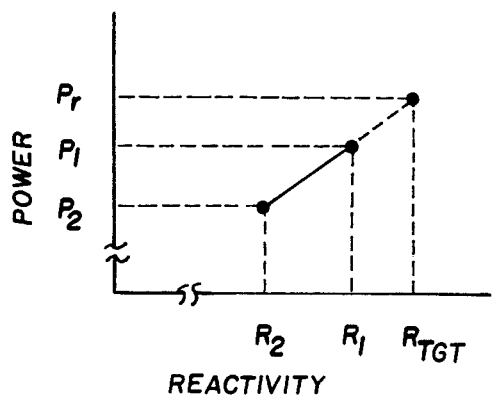
FIG. 17 is a graphical representation of the manner in which the circuit of FIG. 16 operates.

As can be appreciated from an examination of FIG. 17, a refined value for $P_r$ can be obtained by determining the slope of the plotted function between the points established by the values $P_2R_2$ and $P_1R_1$ and then extrapolating it out linearly by multiplying this slope times the difference in reactivity between the $R_2$ value and the $R_{TGT}$ value to arrive at the difference in the power level between $P_2$ and the level $P_r$ corresponding to $R_{TGT}$, and then adding this difference in P to $P_2$ to arrive at the revised value of $P_r$. This may be expressed mathematically as follows:

$$P_r = \frac{(P_1 - P_2)}{(R_1 - R_2)} * (R_{TGT} - R_2) + P_2 \qquad \text{Equation (7)}$$

The above determination is made by the comparator 27 by converting $R_{TGT}$ to a digital signal in A/D converter 69 and storing it in memory 70 as indicated by the θ and O in the triangles touching these components. The feedback circuit then runs through its forecasting simuation to generate the $R_{feedback}$ signal. As the counter reaches count 241, the following operations are performed in sequence:

241: signal in $P_1$ memory 73 shifted to $P_2$ memory 75
242: signal in $R_1$ memory 77 shifted to $R_2$ memory 79
243: signal in $P_r$ memory 81 shifted to $P_1$ memory 73
244: latest $R_{feedback}$ inserted into $R_1$ memory 77
245: $P_2$ from memory 75 subtracted from P from memory 73 in device 83
246: $R_2$ from memory 79 subtracted from $R_1$ from memory 77 in device 85
247: $R_2$ from memory 79 subtracted from $R_{TGT}$ from memory 71 in device 87
248: output of 87 divided by output of 85 in divider 89
249: output of divider 89 multiplied by output of 83 in multiplier 91
250: $P_2$ from memory 75 is added to output of multiplier 91 in adder 93
251: output of adder 93 is stored in memory 81 and converted to analog signal in D/A converter 95.

The new value of $P_r$ serves as the current estimation of the required reduced power level and is also applied to the feedback circuit 31 to be used in the next iteration of $P_r$. As can be seen from the above, the xenon controller utilizes 240 counts of the counter 39 to scan through the current day and determine the projected reactivity during this period. Since, as set forth above, the period between counts is 36 ms, the entire scan requires 8640 ms or exactly one ten-thousandth of a day, the same scale as used in the analog circuit of FIG. 13. The entire 256 count cycle of the xenon suppression controller requires 9216 ms, or slightly less than 10 seconds, including the counts used to calculate $P_r$ following completion of the scan through the day on a compressed scale. While it will be noticed that the xenon suppression controller scans through the entire day every 9.2 seconds, the operative portion of the cycle is between the present time, t, and the target time t. Before t, the analog circuit is not running and after T, the values of $R(\theta)$ generated are not utilized. It should also be realized that as the time t approaches T and the difference in these two times becomes less than the xenon-iodine time constants, the calculated value of $P_r$ will rise. However, the turbine-generator controller 9 uses the calculated reduced power level existing at the time that reduced power is implemented and this power level is maintained until it is time to ramp up again to full power. Since in order to take advantage of the inventin the reactor is switched to reduced power at a time when the time remaining until T exceeds the iodine-xenon time constants, these later changing values of $P_r$ have no effect on power control.

From the above, it can be seen that the xenon suppression controller uses real time measured reactor flux, a standard power curve with a preselected lower thermal limit, a target tme at which the reactor is to return to full power and a reactivity target selected to permit full power, in order to produce a reduced power parameter which is displayed and is available to the turbine-generator controller which controls steam admission to the turbine and generator output. While the xenon suppression controller has been described for implementation by hardwired digital and analog circuits, it should be appreciated that the methods involved may alternatively be implemented through software and a digital computer.

In conclusion, whether the described controller is utilized or the reduced power is lowered a fixed amount each day, xenon suppression is seen as a means of gaining reactivity at the end of each fuel cycle. Because of this, a lower fissile inventory can be used at the beginning of the cycle. Through use of this invention, it is entirely feasible to reduce fuel cycle costs in any large PWR by over $1 million every cycle. There is a small penalty which must be paid for the cycle cost advantages. To obtain the reduction in xenon poisoning during the day, it is necessary to operate at reduced power during the nighttime period. This is not seen as a large disadvantage since in many areas the cost of nighttime electricity is low and utilities will increasingly need to load follow with their nuclear plants as the fraction of nuclear generated electricity grows.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to give the full breadth of the appended claims and any and all equivalents thereof.

We claim:

1. A method of cyclically operating a negative power coefficient nuclear reactor supplying the thermal energy for a steam turbine electric power generating system when 100% power can no longer be maintained at equilibrium due to xenon poisoning, said method comprising the steps of:
   dividing the operating time into intervals of equal length;
   operating at a first power level which is above the highest power level which could be maintained at equilibrium for a first portion of each interval; and
   operating at a reduced power level during a second portion of each interval, the duration of said second portion of each interval and the level of reduced power being selected such that said first power level can be maintained for said first portion of each suceeding interval.

2. The method of claim 1 wherein said first power level is substantially the 100% power level.

3. The method of claim 2 wherein the reduced power level is further reduced for each subsequent interval.

4. The method of claim 3 including the step of terminating operation of the nuclear reactor for refueling when said reduced power level after a plurality of said intervals reaches a predetermined minimum level.

5. The method of claim 4 wherein the predetermined minimum power level is the reactor lower thermal limit.

6. The method of claim 3 wherein the reduced power level during the first interval that the nuclear reactor is operated at reduced power for a portion of each interval is about 3% below the 100% power level and is reduced by about 3% during each subsequent interval.

7. The method of claim 6 wherein operation of the nuclear reactor is terminated when the reduced power level reaches about 25% of the 100% level.

8. The method of claim 1 or 3 including the step of ramping the power up from said reduced power level at the end of said second portion of each interval to the first power level at the beginning of the first portion of the next interval.

9. The method of claim 8 including the step of ramping the power down from the first power level at the end of the first portion of each interval to the reduced power level of the second portion.

10. The method of claim 1, 3 or 4 wherein said interval is twenty-four hours.

11. The method of claim 10 wherein said second portion of each interval is at least equal in duration to the xenon time constant.

12. The method of claim 10 wherein said second portion of each interval is at least six hours in duration.

13. The method of claim 3 wherein said reduced power level is further reduced for each subsequent interval until a predetermined minimum level is reached and then adding the step of maintaining the reduced power level for all further intervals at said minimum level while successively reducing said first power level by a preselected amount for each further interval.

14. The method of claim 13 wherein said first power level is reduced each interval by an amount equivalent to the loss of reactivity during the previous interval.

15. The method of claim 13 wherein said first power level is reduced about 3% per interval.

16. The method of claim 2 wherein operating at a reduced power level includes:
measuring the real time reactor neutron flux;
generating a representation of a selected future reactor neutron flux between the present time and the beginning of the next interval;
repetitively, during each interval, predicting on a compressed time scale as a function of the real time reactor neutron flux and the selected future reactor neutron flux the maximum reduced power level which will permit operation at substantially 100% power at the beginning of the next interval; and
setting the reduced power level to said maximum reduced power level.

17. The method of claim 16 wherein said representation of the future reactor neutron flux is generated during part of said interval from said maximum reduced power level, and
wherein the step of predicting the maximum reduced power level comprises selecting a target reactivity for the beginning of the next interval which suppresses xenon poisoning to a level which provides for operation at substantially 100% power, and repetitively on said compressed time scale generating from said real time reactor flux and the future reactor neutron flux a representation of a predicted reactivity at the beginning of the next interval, and comparing the predicted reactivity with the target reactivity and modifying the maximum reduced power level as a function of the difference therebetween to converge the predicted reactivity with the target reactivity.

18. The method of claim 17 wherein the step of generating a representation of the future reactor neutron flux includes generating a representation on said compressed time scale of a selected load cycle to be followed by the electric power generating system during said interval, comparing on said compressed time scale said selected load cycle with the maximum reduced power level and selecting the larger of the two as representing the future reactor neutron flux used in determining the predicted reactivity.

19. The method of claim 18 wherein said selected load cycle includes a period of reduced power corresponding to the second portion of each interval and wherein the power level of said load cycle during this period is the minimum thermal limit for operation of said reactor.

20. The method of claim 17 wherein the step of generating a representation of the future neutron reactor flux includes generating a representation on said compressed time scale of a selected load cycle to be followed by the electric power generating system during said interval and selecting said maximum reduced power level as representing the future reactor neutron flux during the time on the compressed time scale corresponding to the second portion of each interval and selecting said load cycle representation during the remaining portion of each interval.

21. A method of operating a turbine-generator controller controlling a steam turbine electric power generating system including a negative power coefficient nuclear reactor to suppress reactor xenon poisoning when the reactor can no longer be run at 100% power at equilibrium due to the xenon poisoning, said method comprising the steps of:
generating a signal representative of a selected future load to be carried by the electric power generating system between the present time and a selected future time including operation over at least part of this period in response to a reduced power signal;
generating signals representative of the present xenon and iodine levels in the reactor;
repetitively generating on a reduced time scale and in response to the present xenon and iodine level signals and to the future load signal, a predicted reactivity signal representative of the reactivity of the reactor at the selected future time;
generating a target reactivity signal selected to permit operation of the reactor at the selected future time at substantially 100% power;
comparing the predicted reactivity signal with said target reactivity signal and generating the reduced power signal as a function of the difference therebetween;
using this reduced power signal in generating the future load signal such that on successive iterations the predicted reactivity signal converges toward the target reactivity signal; and
applying the reduced power signal to the turbine-generator controller to set reactor power at the level represented thereby for a first period of time of a duration such that the reactor can be operated at substantially 100% power for a second period of time beginning at said selected future time.

22. The method of claim 21 wherein the step of generating the present xenon and iodine level signals comprises the steps of:
measuring on a real time basis the reactor neutron flux;
integrating on a continuing real time basis the present measured neutron flux with selected scaling to generate the present iodine level signal; and
integrating on a continuing real time basis the measured neutron flux and the present iodine level signal with selected scaling to generate the present xenon level signal.

23. The method of claim 22 wherein the step of repetitively generating the predicted reactivity signal comprises the steps of:
repetitively integrating, on a compressed time scale beginning at the present time, the future load signal with selected scaling and with the present iodine level signal as the initial condition of the integration to generate a future iodine level signal;
repetitively integrating, on a compressed time scale beginning at the present time, the future load signal and the future iodine signal with selected scaling and with the present xenon level signal as the initial condition of the integration to generate a future iodine level signal;

scaling the future xenon level signal to convert it to a future reactivity signal;

storing the value of the future reactivity signal at the selected future time on the compressed time scale; and utilizing the stored future reactivity signal as the predicted reactivity signal.

24. The method of claim 23 wherein the step of generating said future load signal comprises the steps of:

storing a selected load cycle representative of the selected load as a function of time to be carried by the electric power generating system;

repetitively scanning on said compressed time scale said stored load cycle representation to generate an instantaneous selected load signal;

comparing the instantaneous selected load signal with the reduced power signal and selecting the larger signal as the future load signal; and synchronizing said scanning of the stored load cycle with the integration steps of claim 23.

25. The method of claim 21 or 24 wherein the step of comparing the predicted reactivity signal and the target reactivity signal and of generating the reduced power signal comprises the steps of storing the two most recent values of the predicted reactivity and the reduced power signals corresponding thereto, and determining the new value for the reduced power signal by extrapolating from the stored values of the predicted reactivity and corresponding reduced power signals to the value of the reduced power signal corresponding to the target reactivity.

26. The method of claim 21 or 24 wherein said reduced time scale is a plurality of orders of magnitude less than real time.

27. The method of claim 26 wherein said reduced time scale is four orders of magnitude less than real time.

28. A xenon suppression controller for generating a reduced power signal to be utilized by a turbine generator controller controlling a steam turbine electric power generating system including a negative power coefficient nuclear reactor to suppress reactor xenon poisoning in a manner such that by operating the reactor at said reduced power for a period of time the reaction can be run at substantially 100% power at a selected future time even though it can no longer be run at 100% power at equilibrium due to the xenon poisoning, said controller comprising:

means for generating a signal representative of a selected future load to be carried by the electric power generating system between the present time and said selected future time including operation over at least part of this period in response to a reduced power signal, means for generating signals representative of the present xenon and iodine levels in the reactor, means responsive to the present xenon and iodine level signals and to the future load signal for repetitively generating on a compressed time scale a predicted reactivity signal representative of the reactivity of the reactor at the selected future time, means for generating a target reactivity signal selected to permit operation of the reactor at the selected future time at substantially 100% power, means for comparing the predicted reactivity signal with said target reactivity signal and for generating the reduced power signal as a function of the difference therebetween; and means for feeding the reduced power signal back to the future load signal generating means such that on successive iterations the predicted reactivity signal converges toward the target reactivity signal.

29. The controller of claim 28 wherein the means for generating the present xenon and iodine level signals include means for measuring on a real time basis the reactor neutron flux and integrators with selected scaling for generating said present xenon and iodine level signals from said real time neutron flux measurements.

30. The controller of claim 29 wherein the means for generating the predicted reactivity signal on a compressed time scale includes a pair of integrators each with a gain selected to effect said time compression, initializing means for applying with selected scaling said present iodine level signal to one integrator and said present xenon level signal to the other as initial conditions, means for applying with selected scaling said future load signal to the inputs of both integrators, means for applying with selected scaling the output of the iodine integrator to the input of the xenon integrator, means for storing the output of the xenon integrator at the selected time on the compressed time scale, and means for outputting the stored signal as the predicted reactivity signal.

31. The controller of claim 30 wherein said means for generating the future load signal includes means for storing a signal representative of a selected load cycle for the electric power generating system covering at least the period from the present to said selected time, means for scanning said stored load cycle signal on said compressed time scale to generate an instantaneous selected load signal, means for selecting as said future load signal the larger between said instantaneous selected load signal and said reduced power signal.

32. The controller of claim 31 including means for synchronizing the scanning of the stored load cycle signal and the integrator initializing means.

* * * * *